United States Patent [19]
Kurtz et al.

[11] Patent Number: 4,868,383
[45] Date of Patent: Sep. 19, 1989

[54] LINEAR INTEGRATING CAVITY LIGHT SOURCE USED FOR GENERATING AN INTENSE BEAM OF LIGHT

[75] Inventors: Andrew F. Kurtz, Rochester; Bruce R. Whiting, Pittsford; John C. Boutet, Rochester; James R. Milch, Pittsford; John Gasper, Hilton; David Kessler, Rochester, all of N.Y.

[73] Assignee: Eastman Kodak Company, Rochester, N.Y.

[21] Appl. No.: 241,637

[22] Filed: Sep. 8, 1988

[51] Int. Cl.[4] .................................................. G01J 1/00
[52] U.S. Cl. ...................................... 250/228; 356/236
[58] Field of Search ............... 250/205, 228; 355/67, 355/70; 356/236, 446; 358/292–294

[56] References Cited

U.S. PATENT DOCUMENTS

| | | | |
|---|---|---|---|
| 1,894,876 | 1/1933 | Kuhn | 362/302 |
| 2,548,783 | 4/1951 | Goldsmith | 358/75 |
| 2,821,103 | 1/1958 | Blet | 356/236 |
| 3,115,309 | 12/1963 | Spencer et al. | 362/217 |
| 3,488,117 | 1/1970 | Weisglass | 355/37 |
| 3,717,781 | 2/1973 | Sadoski et al. | 313/488 |
| 3,874,799 | 4/1975 | Isaacs et al. | 250/228 |
| 3,887,816 | 6/1975 | Colley | 250/571 |
| 3,920,336 | 11/1975 | Sackett | 250/228 |
| 3,988,537 | 10/1976 | Cooley | 355/67 |
| 4,113,379 | 9/1978 | Harada et al. | 355/70 |
| 4,128,332 | 12/1978 | Rowe | 355/70 |
| 4,186,431 | 1/1980 | Engel et al. | 362/223 |
| 4,232,971 | 11/1980 | Suga | 250/228 |
| 4,295,186 | 10/1981 | Sugiura et al. | 362/217 |
| 4,321,630 | 3/1982 | Kramer | 358/293 |
| 4,378,159 | 3/1983 | Galbraith | 356/236 |
| 4,453,180 | 6/1984 | Juergensen | 250/228 |
| 4,568,984 | 2/1986 | Juergensen et al. | 358/293 |
| 4,658,131 | 4/1987 | Stark | 356/236 |
| 4,721,093 | 1/1988 | Bullock et al. | 362/308 |
| 4,725,893 | 2/1988 | Granger | 358/294 |
| 4,743,759 | 5/1988 | Boutet | 250/228 |
| 4,752,689 | 6/1988 | Satake | 356/446 |

FOREIGN PATENT DOCUMENTS

| | | | |
|---|---|---|---|
| 2642459 | 1/1988 | Fed. Rep. of Germany | 355/70 |
| 59154060 | 6/1981 | Japan | 355/70 |
| 55145409 | 10/1981 | Japan | 355/70 |

Primary Examiner—David C. Nelms
Assistant Examiner—Stephone B. Allen
Attorney, Agent, or Firm—Thomas H. Close

[57] ABSTRACT

A linear light source for a film scanner includes means for generating an intense beam of light and an elongated cylindrical integrating cavity having diffusely reflective walls, and defining an input port through which the intense beam is introduced into the cavity and an output slit parallel to the long axis of the cylindrical integrating cavity to emit a uniform line of light.

17 Claims, 7 Drawing Sheets

ANGULAR DISTRIBUTION OF LIGHT AT OUTPUT SLIT
MEASURED PERPENDICULAR TO SLIT LENGTH

FIG. 5

LINEAR DISTRIBUTION OF I ALONG SLIT

LINEAR INTEGRATING CAVITY LIGHT SOURCE USED FOR GENERATING AN INTENSE BEAM OF LIGHT

FIELD OF THE INVENTION

The present invention relates to a linear light source, and more particularly to a linear light source for use in a film scanner employing a linear image sensor.

BACKGROUND OF THE INVENTION

Apparatus such as document and film scanners having linear image sensing arrays to produce an electronic image signal by sensing the original a line at a time, employ linear light sources to illuminate the original one line at a time. U.S. Pat. No. 4,186,431 issued to Engel et al., Jan. 29, 1980, shows a linear light source for use in a document scanner. The light source comprises an elongated incandescent lamp inside a specularly reflective tube. The reflective tube is provided with a slit to emit a line of light, and a light diffusing strip over the slit to produce a pattern of uniform intensity along the slit.

For a film scanner, operating at normal film projection rates, e.g. 24 frames per second, an intense uniform source of light is required. For optimum scratch suppression, it is also desirable for the light to be diffuse and nearly uniform in angular distribution (i.e. Lambertian). The straight line light source described in U.S. Pat. No. 4,186,431 suffers from the drawback that the incandescent light source is not as bright as desired for a high resolution film scanner and does not have the best color temperature for scanning color film. Intense light sources such as Xenon arc lamps and lasers are not produced in a linear configuration like the elongated incandescent lamp. Furthermore, the intensity distribution produced by the light source can be improved.

It is therefore the object of the present invention to provide apparatus for producing a line of illumination that is free from the shortcomings noted above.

SUMMARY OF THE INVENTION

According to the present invention, the object is achieved by providing apparatus for producing a line of illumination comprising a light source for producing an intense beam of light, and an elongated cylindrical light integrating cavity having diffusely reflective walls and defining an input port through which the intense beam of light is introduced to the cavity, and an output slit parallel to the long axis of the cylindrical integrating cavity through which a line of diffuse illumination exits the cavity. In a preferred embodiment, the input port is arranged off axis of the output slit so that the intense beam of light cannot exit the slit directly without at least one diffuse reflection inside the cavity. With the apparatus of the present invention, the light source may be larger than the dimensions of the integrating cavity, thereby permitting the use of powerful light sources such as Xenon arc lamps or lasers that do not have an elongated geometry.

According to another aspect of the invention, the temporal uniformity of the line light source is improved by further providing a feedback port in the integrating cylinder, sampling the light emitted from the feedback port with a feedback detector, and controlling the power to the light source with a feedback circuit to remove temporal variations. In a preferred mode of practicing the invention, the detector is coupled to the output port via a fibre optic coupling.

The angular distribution of the light exiting the output slit is optimized for film scanning by shaping the edges of the output slit such that the edges of the slit lie in a plane tangent to the surface of the cylindrical cavity. In a preferred embodiment of the apparatus, the cavity is formed from a reflective polytetrafluoro ethylene material.

MODES OF PRACTICING THE INVENTION

Figure 1:
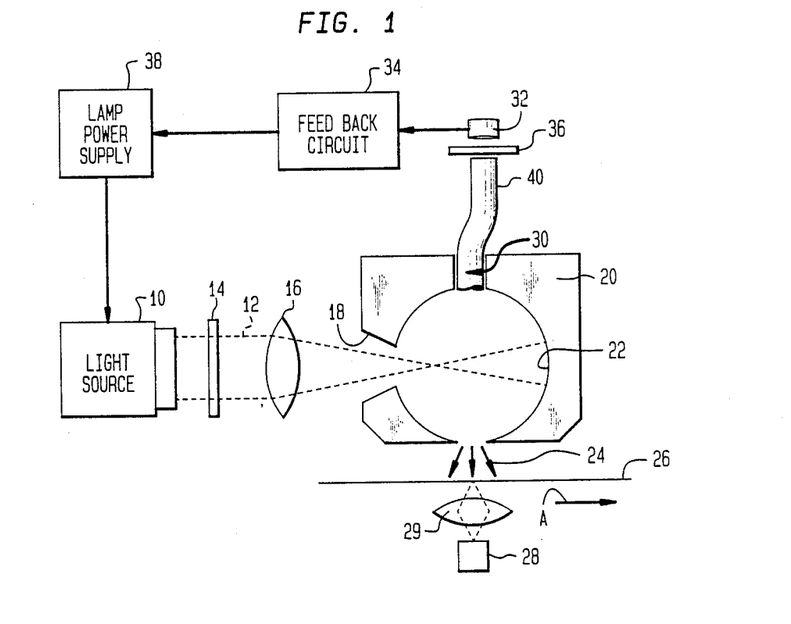
FIG. 1 is a schematic diagram showing a line light source according to the present invention, in a film scanner.

Referring to FIG. 1, apparatus for producing a line of illumination in a film scanner according to the present invention is shown schematically. The apparatus includes a light source 10, such as a Xenon arc lamp for producing an intense beam 12 of light. The light beam 12 is spectrally filtered by a filters 14 to remove infrared and ultraviolet radiation, and is focused by a lens 16 onto an input port 18 of a cylindrical integrating cavity 20. Although a right circular cylindrical cavity is shown, other cross sections, such as rectangular, elliptical, etc. can be employed. Preferably, the light is brought to a focus just inside the cavity as shown in FIG. 1, and diverges before striking the opposite wall of the cavity. The internal surface 22 of the integrating cavity is diffusely reflecting. The integrating cavity 20 defines an output slit 24 that emits a line of light to illuminate a film 26. The image on the film is sensed one line at a time by a linear image sensor 28, such as a CCD linear image sensor. The film is imaged on the linear image sensor 28 by a lens 29 and is advanced in the direction of arrow A to effect an area scan of the film image.

Since bright light sources such as Xenon arc lamps vary in intensity due to wandering of the plasma in the arc, means are provided for stabilizing the output of the light source in time. In the prior art, light from the source was sampled by placing a partially silvered mirror or beam splitter in the light beam, and extracting a sample of the light beam for a feedback signal. The present inventors have discovered through experimentation that much better temporal control of the illumination intensity is achieved by sampling the diffuse light from the integrating cavity. Accordingly, a feedback port 30 is provided in the integrating cavity 20 to remove a sample of the diffuse light. The light exiting the feedback port 30 is directed to a photosensor such as a silicon photo diode 32. A neutral density filter 36 is optionally placed over the photocell 32 to control the intensity of the light received. The signal generated by the photocell 32 is detected in a feedback circuit 34, which generates a control signal for lamp power supply 38, to remove intensity fluctuations from the light source 10. It has been discovered through experimentation that the noise in the light intensity from the output slit is further reduced by between 3 to 8 db when a fiber optic bundle 40 is employed to direct the light from the integrating cavity 20 to detector 32.

Figure 2:
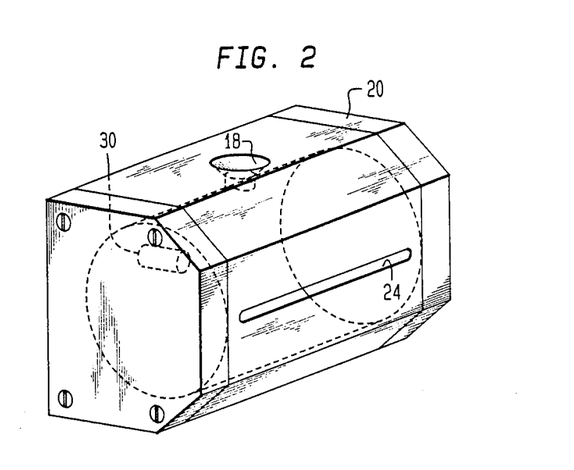
FIG. 2 is a perspective view of the integrating cavity shown in FIG. 1.

FIG. 2 shows a presently preferred embodiment of integrating cavity 20 for scanning 35 mm film in a telecine. The integrating cavity is preferably machined from a block of diffusely reflecting polytetrafluoro ethylene plastic, known as Spectralon TM available from the Labsphere Corporation, North Sutton, N.H. For the 35 mm scanning application, the integrating cavity is a circular cylinder 38 mm long and 20 mm in diameter. The input port 18 is a round hole 6–8 mm in diameter, the feedback port 30 is a round hole to the end of the cylindrical cavity 4 mm in diameter. The exit slot 24 is 2 mm wide by 30 mm long.

Alternatively, the cavity 20 may be constructed from a material such as aluminum, with a diffusely reflective coating on the internal surfaces, such as barium sulfate based paint (available as Eastman White TM from the Eastman Kodak Company, Rochester, N.Y.).

Figure 3A:
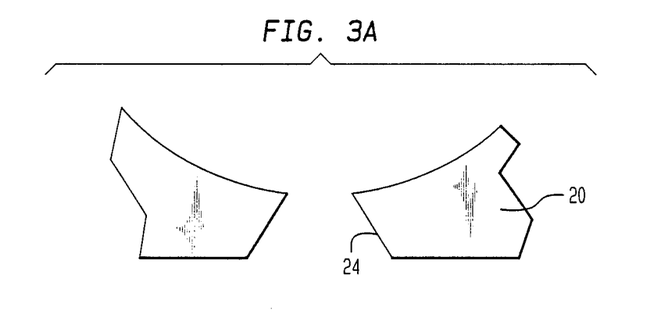
FIGS. 3A-C are partial cross sectional views of various configurations of the output slit in the integrating cavity.
Figure 3B:
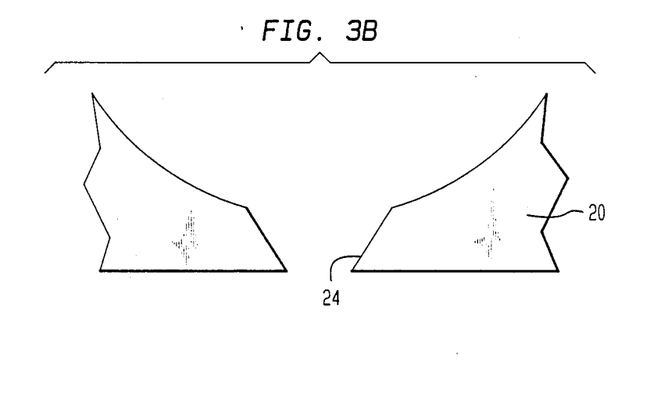
Figure 3C:
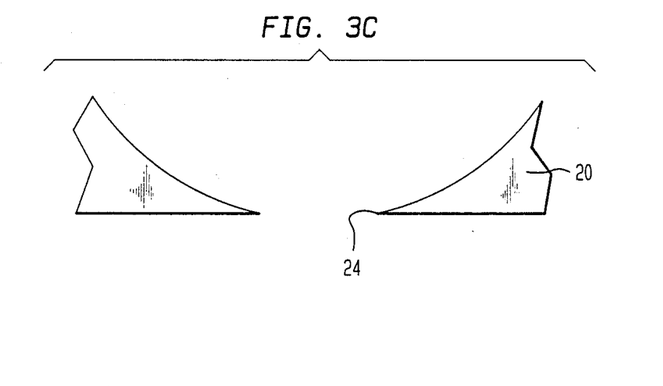
Figure 4:
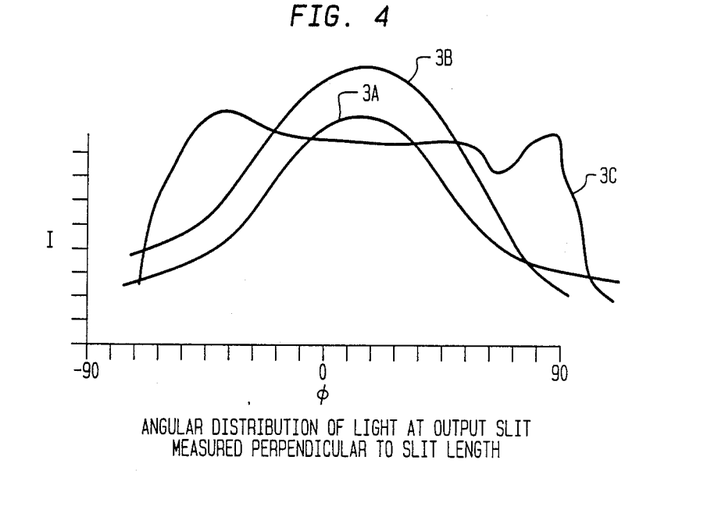
FIG. 4 is a graph illustrating the angular intensity distribution of light from the different output slit geometries.

To provide optimum illumination in a film scanner, it is important to tailor the angular distribution of light from the slit so that optimum scratch suppression is provided. Experiments were performed on the geometry of the sides of the output slit 24 to determine the effect on angular distribution of the light, and hence on scratch suppression. FIGS. 3A–C show different slit geometry configurations for the sides of output slit 24 that were tried. In FIG. 3A, the sides slope such that the slit widens away from the cavity. In FIG. 3B, the slit narrows away from the cavity, and in FIG. 3C, the edges of the slit are formed by a cutting plane that is substantially tangent to the circular cavity. FIG. 4 shows the angular distributions of light that were measured in a direction perpendicular to the slit length for each of the slit configurations 3A, B, and C. Tests showed that the configuration shown in FIG. 3C provides the best scratch suppression, and is therefore presently preferred.

Figure 5:
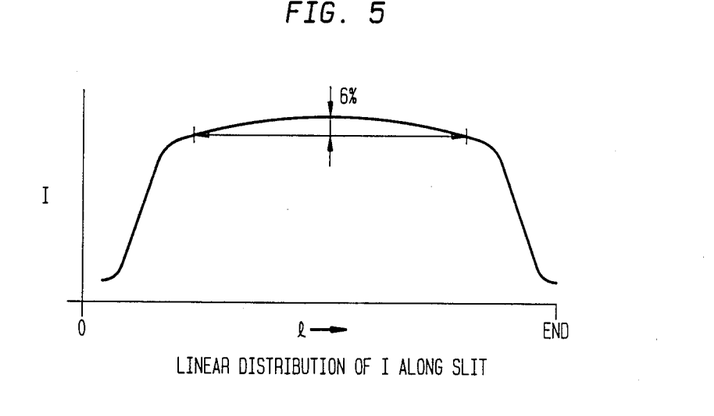
FIG. 5 is a graph illustrating the intensity distribution of the light along the slit.

FIG. 5 is a graph illustrating the light intensity measured along the slit 24, showing the good uniformity achieved by the linear light source of the present invention. The measured uniformity is a "Frown" of −6% over the central 21 mm, with a sharp roll off at the edges. It was found through experimentation that uniformity of the light intensity along the slit can be further improved by lengthening the cavity, however, the light emitting efficiency of the system is thereby reduced. In the preferred mode for use in a 35 mm telecine film scanner, the light source was a Cermax TM LX 300F Xenon Arc Lamp in a R300 lamp holder. The power supply is a Cermax PS300-1 power supply available from ILC Technology, Sunnyvale, CA.

Figure 6:
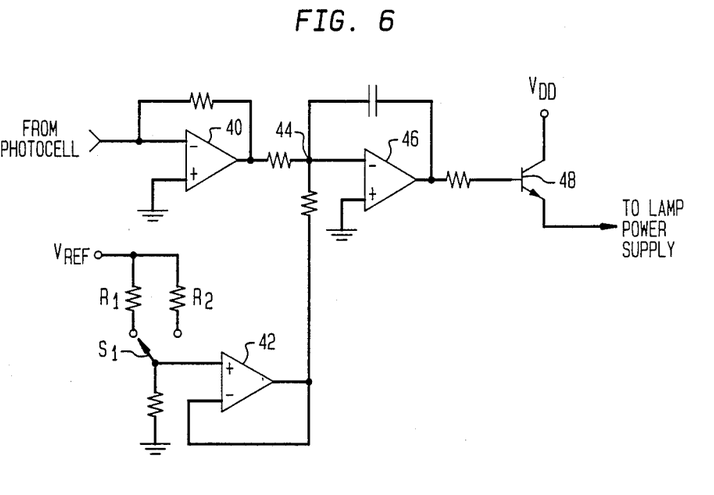
FIG. 6 is a circuit diagram of the feedback circuit shown in FIG. 1.

The feedback circuit 34 is shown schematically in FIG. 6. The feedback circuit includes a first operational amplifier 40 for converting the current signal from the photocell to a voltage. A second operational amplifier 42 generates a dc reference voltage for controlling the brightness of the linear light source. The operational amplifier 42 receives a reference voltage through a switch S1 from a voltage reference $V_{ref}$ through a first resistor R1 to control the intensity of the light for operation of the film scanner at 30 frames per second and a second reference voltage through a resistor R2 for controlling operation of the film scanner at 24 frames per second. The reference voltage supplied by operational amplifier 42 and the voltage from the photocell supplied by operational amplifier 40 are combined at a summing node 44 and applied to the input of an operational amplifier 46 configured as an integrator. Operational amplifier 46 maintains a constant dc level output voltage and compensates for instantaneous variation in the signal from the photocell. The output voltage from operational amplifier 46 is supplied to the base of the transistor 48 operating as a buffer amplifier. The output from the transistor 48 is applied to the control input of the lamp power supply.

Figure 7:
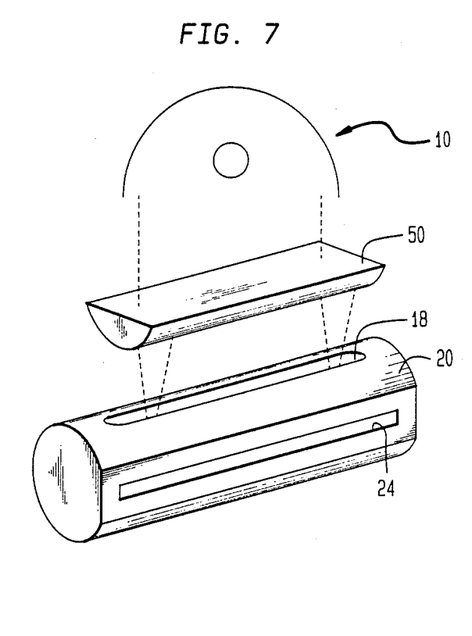
FIG. 7 is a perspective view showing an embodiment of a light source for use with a film scanner for an intermediate width film.
Figure 8:
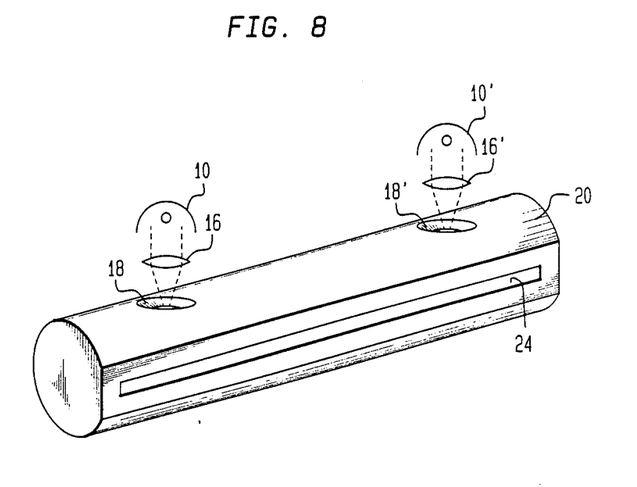
FIG. 8 is a perspective view showing an embodiment of the present invention for use with a film scanner for wide film.
Figure 9:
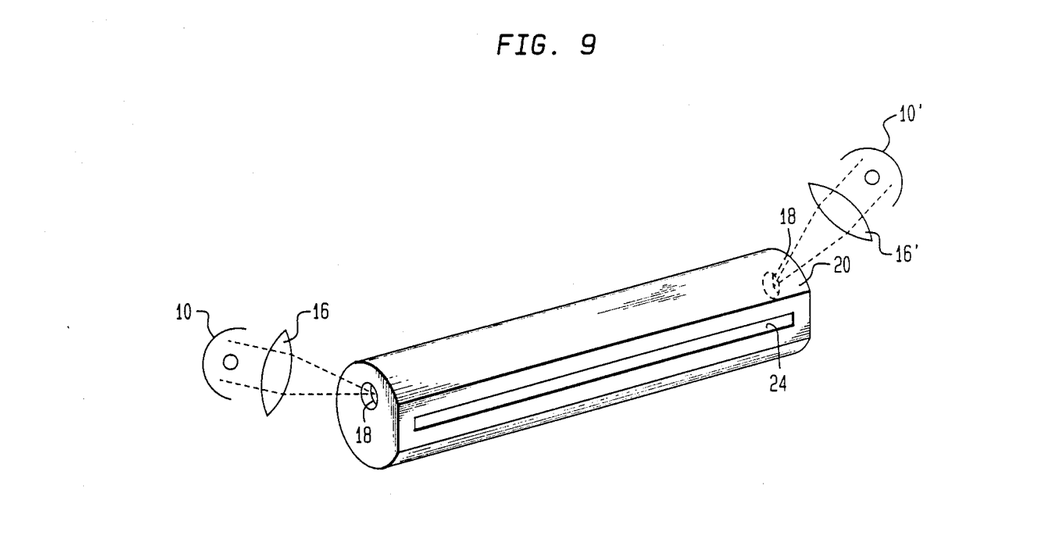
FIG. 9 is an alternative embodiment similar to FIG. 8, with input ports in the ends of the integrating cylinder.

For larger film formats, e.g. greater than 50 mm wide, it has been found that the uniformity of intensity along the slit varies more than is desired if the light input is through a single centrally located input port as in the examples described above. To improve the uniformity in a light source of intermediate length, e.g. 50–75 mm, a cylindrical lens 50 and a slot shaped input port 18 may be employed as shown in FIG. 7. For longer sources, e.g. 75 mm or more, more than one light input source 10 and 10' may be employed as shown in FIG. 8 introducing the light beams through a plurality of input ports 18, 18' as shown in FIG. 8. The multiple light beams may also be introduced into the integrating cavity through slits as shown in FIG. 7, or through the ends of the cavity as shown in FIG. 9.

Figure 10:
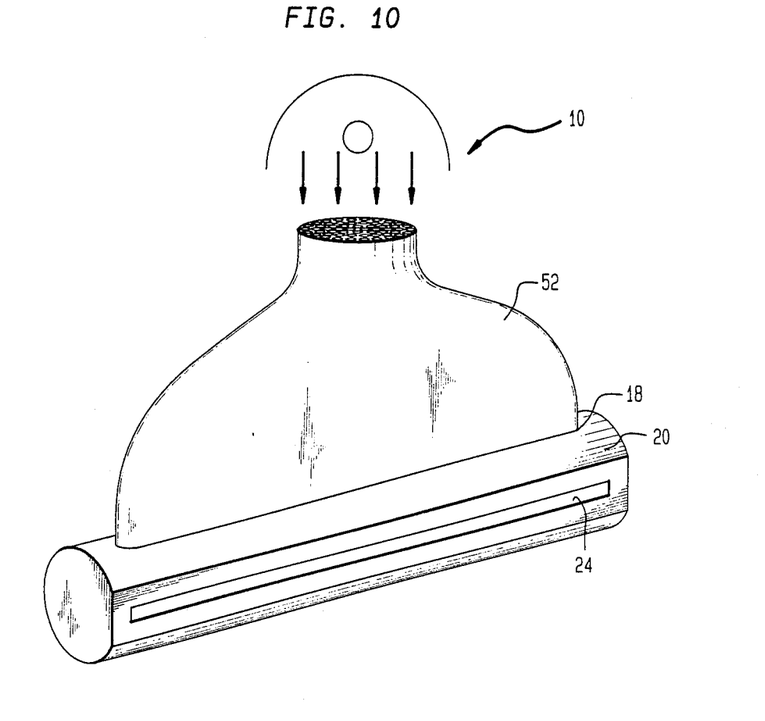
FIG. 10 is a schematic diagram showing an embodiment of the linear light source of the present invention showing a fiber optic area to line converter for introducing the light beam into the integrating cavity.

An alternative means of introducing the light into the integrating cavity for improved uniformity at the output slit is to employ an area-to-line fibre optic converter 52 as shown in FIG. 10. The area end of the area-to-line fibre optic converter 52 is illuminated by light source 10 and the linear end of the area-to-line fibre optic converter 52 is located adjacent at input slit 18 in the light integrating cavity 20.

In one application for scanning wide film a light source of the type shown in FIG. 10 was constructed having an integrating cavity 215 mm long ×35 mm in diameter. The input slit was 2.0 mm wide by 200 mm long; and the output slit was 1.5 mm wide by 200 mm long. The light source 10 was a tungsten halogen projector lamp.

Figure 11:
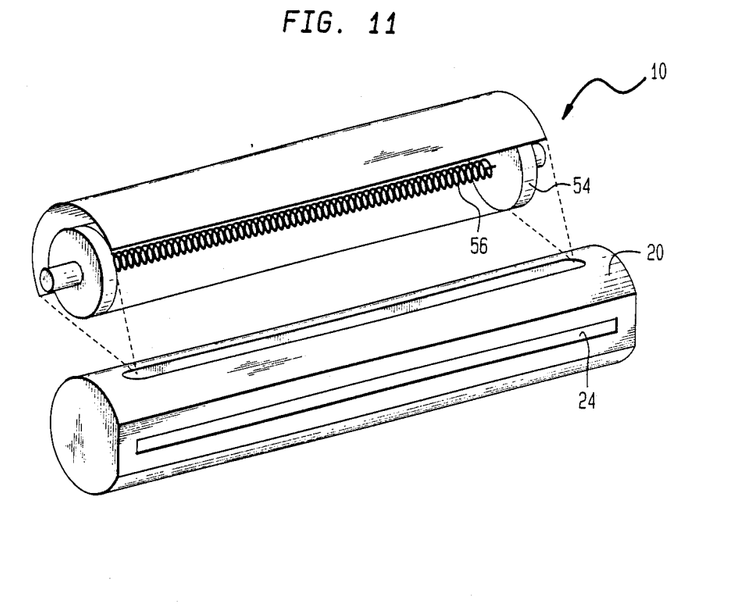
FIG. 11 is a schematic diagram showing an embodiment of the present invention employing a coiled filament tungsten lamp.

The light source for producing the intense beam of light may also comprise a laser where an intense monochromatic line of light is desired. As is known in the art, to suppress laser speckle, a suitable dithering optical element such as a vibrating mirror in the laser optical path can be used to "blur" the speckle.

Where less intense light source is required, a tungsten lamp with a coiled filament can be employed as a light source. FIG. 11 shows an embodiment, where the light source 10 is a tungsten lamp 54 with a coiled filament 56.

Figure 12:
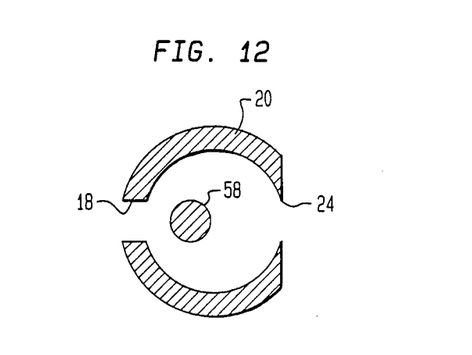
FIG. 12 is a cross sectional view of an alternative embodiment of the integrating cavity.

In the above examples, the input port was arranged off axis of the output slit so that direct illumination from the light source could not exit the output slit without at least one diffuse reflection in the integrating cavity. Further protection from light directly exiting the output slit may be provided by arranging a baffle in the interior of the cavity between the input port and the output port. Alternatively, the input port may be arranged opposite the output slit and means for baffling or diffusing the input light provided within the integrating cavity. FIG. 12 is a schematic cross sectional view of the integrating cavity 20 with the input port 18 directly across from the output slit 24. A diffuser such as a glass ball or a rod 58 having a diffusely reflective surface is placed between the input port 18 and the output slit 24 to prevent light from passing directly from the input port 18 to the output slit 24.

Industrial Applicability and Advantages

The linear light source of the present invention is useful in a film scanner of the type employing a linear image sensor. The light source is advantageous in that an intense line of light is produced having a highly uniform intensity along the line and a nearly uniform angular distribution for optimum scratch suppression in a film scanner. The linear light source further has the advantage that temporal fluctuations are minimized by employing the light from the integrating cavity as a feedback signal to power the light source.

We claim:
1. Apparatus for producing a line of illuminating, comprising:
   a. a light source for producing an intense beam of light;
   b. an elongated cylindrical light integrating cavity having diffusely reflecting walls and defining an input port through which said light beam is introduced into the cavity, and an output slit parallel to the long axis of the cavity through which the line of illumination exits, the light beam being introduced into the cavity such that the light undergoes at least one diffuse reflection before exiting the output slit.

2. The apparatus claimed in claim 1 wherein said input port is arranged off-axis of said output slit.

3. The apparatus claimed in claim 1 wherein said input port is arranged across from said output slit and further comprising diffusing means in the optical path between said input port and said output slit for preventing light from directly passing from said input port to said output slit.

4. The apparatus claimed in claim 1 wherein the light source comprises an arc lamp and optical means for focusing the beam produced by the lamp onto the input port.

5. The apparatus claimed in claim 1 wherein the edges of the output slit are defined by a single cutting plane parallel to the long axis of the cylindrical cavity and substantially tangent to the surface of the cavity.

6. The apparatus claimed in claim 1 wherein the cylindrical light integrating cavity comprises a non diffusely reflective material having a diffusely reflecting coating on the inside of the cavity.

7. The apparatus claimed in claim 1 for use with a 35 mm film scanner, wherein the integrating cavity is 3.8 cm long by 2.0 cm in diameter, the output slit is 3.0 cm long and 2.0 mm wide.

8. The apparatus claimed in claim 1, wherein the light source is a laser.

9. The apparatus claimed in claim 1, wherein the input port is a slit parallel to the long axis of the cylindrical cavity and the light source is a linear coiled tungsten filament lamp.

10. The apparatus claimed in claim 1 wherein the cavity further defines a feedback port for removing a beam of diffuse light from the cavity and further including feedback circuit means for sensing the intensity of the feedback beam and controlling the light source in response thereto.

11. The apparatus claimed in claim 1 wherein the light integrating cavity comprises a diffusely reflective material.

12. The apparatus claimed in claim 1 for use with a x-ray film scanner, wherein the integrating cavity is 39.6 cm long by 4 cm in diameter and the output slit is 39 cm long by 4 mm wide.

13. The apparatus claimed in claim 1 for use with a large format photographic film scanner, wherein the integrating cavity is 215 mm long by 35 mm in diameter and the output slit is 200 mm long by 1.5 mm wide and the light source is a tungsten halogen lamp.

14. The apparatus claimed in claim 10 wherein said feedback circuit means includes a photocell for sensing the feedback light and further comprising a fiber optic light guide for transmitting light from the feedback port to the photocell.

15. The apparatus claimed in claim 11 wherein the diffusely reflective material is a diffusely reflective polytetrafluoro ethylene plastic.

16. The apparatus claimed in claim 12 further comprising a second light source for producing an intense beam of light and said elongated cylindrical light integrating cavity defining a second input port for receiving the beam from the second light source.

17. The invention claimed in claim 13 wherein the input port is a slit parallel to the long axis of the cylindrical cavity and said light source comprising a lamp and a fiber optic area-to-line light guide having an area input end and a line output end. The line output end of the light guide being arranged at the input port and the area input end being arranged to receive light from the light source.

* * * * *